Figure 1:
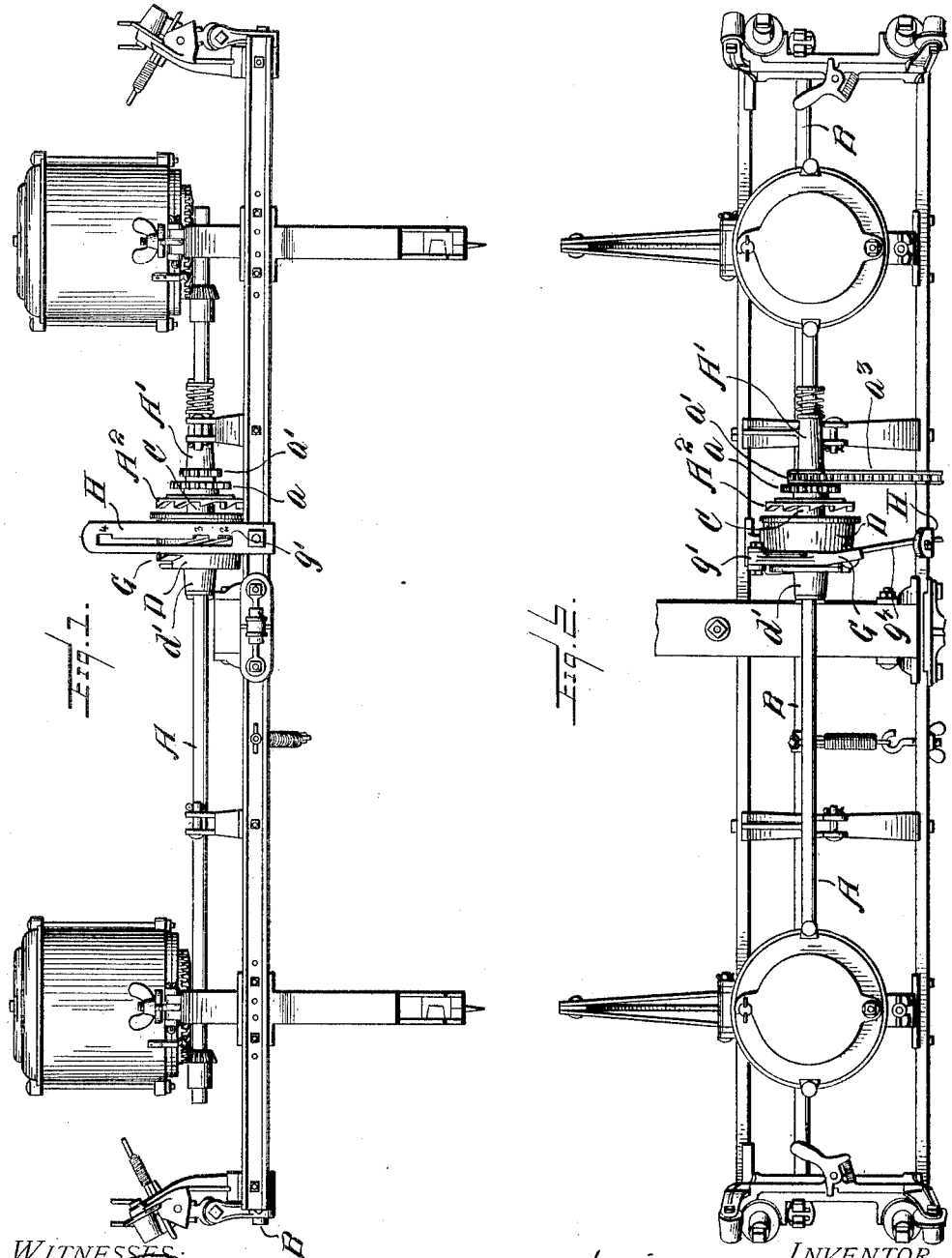

W. L. BEALL.
PLANTING MACHINE.
APPLICATION FILED JULY 29, 1909.

1,116,547.

Patented Nov. 10, 1914.
3 SHEETS—SHEET 2.

WITNESSES:

INVENTOR
William L. Beall
BY
Attorneys

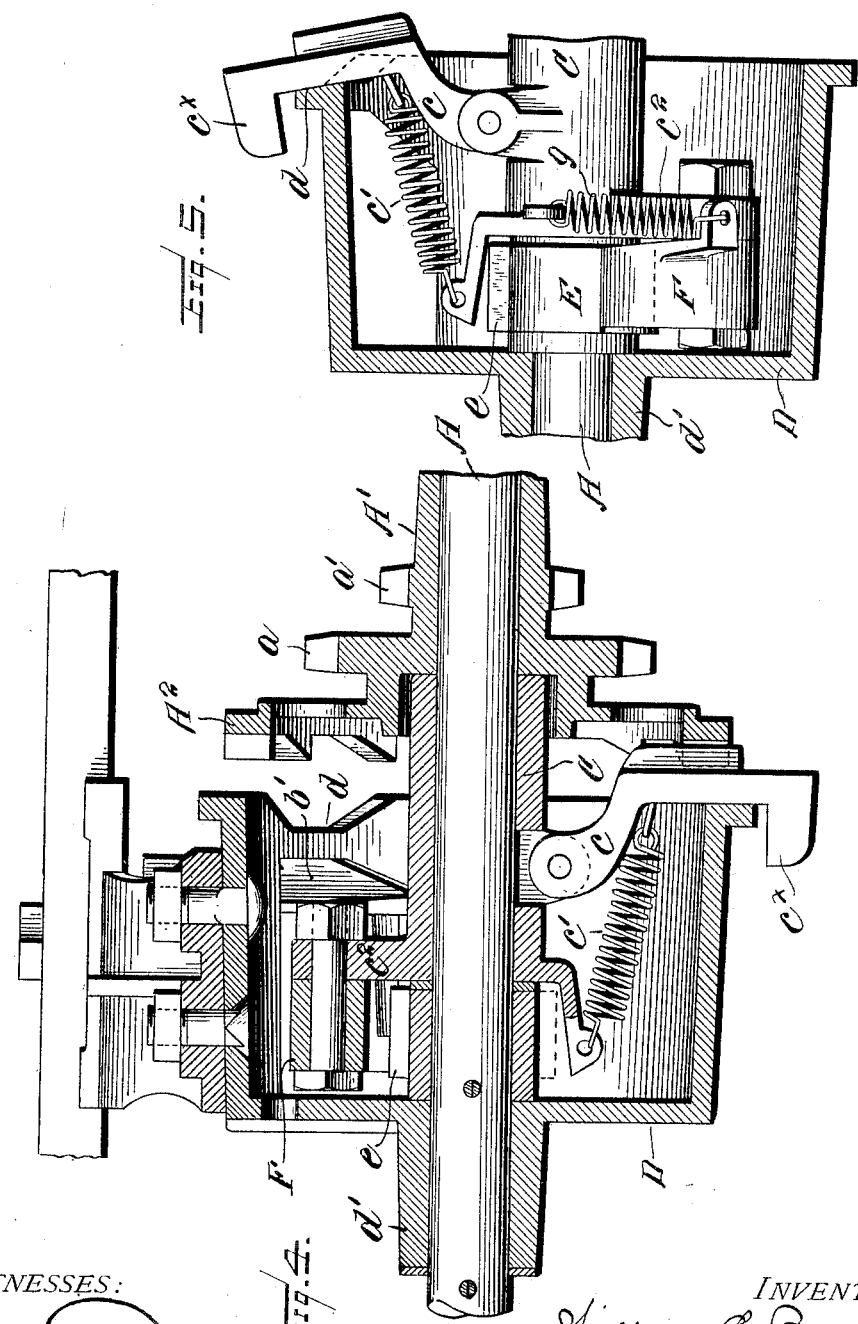

UNITED STATES PATENT OFFICE.

WILLIAM L. BEALL, OF ALBION, MICHIGAN, ASSIGNOR TO GALE MANUFACTURING COMPANY, OF ALBION, MICHIGAN.

PLANTING-MACHINE.

1,116,547. Specification of Letters Patent. Patented Nov. 10, 1914.

Application filed July 29, 1909. Serial No. 510,178.

*To all whom it may concern:*

Be it known that I, WILLIAM L. BEALL, a citizen of the United States, residing at Albion, in the county of Calhoun and State of Michigan, have invented certain new and useful Improvements in Planting-Machines; and I do hereby declare the following to be a full, clear, and exact description of the invention, such as will enable others skilled in the art to which it appertains to make and use the same.

My present invention relates to corn planters and consists in an improved variable feed clutch or variable dropping device for such implements.

In the drawings accompanying and forming a part of this specification, I have shown the best form in which I have contemplated embodying my invention and said invention is disclosed in the following description and claims.

Figure 2:
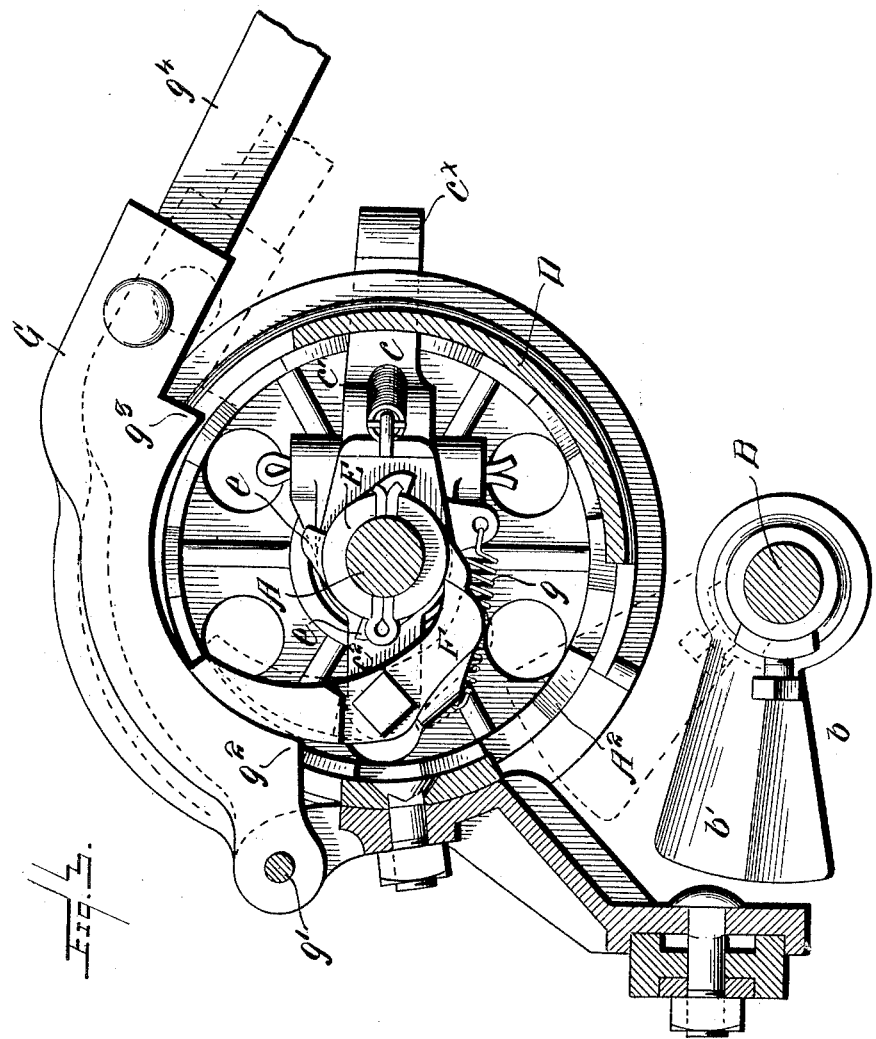

In the said drawings, Figure 1 is a rear view in elevation of the seed hoppers and connected parts. Fig. 2 is a top plan view of the same. Fig. 3 is a view of the clutch mechanism controlling the feed or dropper plate, with the end of the inclosing casing removed and looking at the clutch from the left end of the planter as viewed from the rear. Fig. 4 is a longitudinal section of the clutch mechanism with the pawl of the clutch in engagement with the constantly rotating ratchet, and Fig. 5 is a like sectional view with the pawl out of engagement.

The devices which constitute my improvement are shown as applied to a check row planter, the check row devices being of any ordinary or preferred character. The seeds or kernels are dropped by a rotating seed plate in the bottom of each hopper and such seed plates are provided with cells each adapted to contain a single seed or kernel. As these seed plates are old and well known in the art, it is thought unnecessary to show the same.

In the drawings A is the dropper shaft which is connected to the seed plate by suitable connecting parts and driven by mechanism hereinafter described to effect the necessary movement of the seed plate to drop the number of kernels desired. These connecting parts may be of any preferred form.

B is the rock shaft operated by the check row mechanism.

On the shaft A is loosely mounted the sleeve A' which carries the ratchet wheel $A^2$ and one or more sprocket wheels $a$ $a'$. These sprocket wheels are actuated from the axle of the machine by means of a sprocket chain as shown at $a^3$, and are in constant operation. A further sleeve C is also loosely mounted on the shaft A. This sleeve extends within the housing or casing D secured to the framing or other stationary part of the machine and a pawl $c$ is pivoted to said sleeve. A spring $c'$ is connected to said pawl in such a manner as to draw the pawl against one end of the casing. The end of the casing against which the pawl bears is provided with a recess or notch $d$. The side of the pawl opposite that which engages the end of the housing or casing D is so constructed that when the pawl is forced out of the notch $d$ it will engage with the teeth of the ratchet wheel and be moved thereby until it again comes opposite the notch $d$ and is withdrawn from engagement with the teeth of the ratchet by the spring $c'$. When the pawl $c$ is moved out of the notch or recess $d$ the end of the housing or casing D holds the pawl in engagement with the ratchet until the pawl is brought in line with the notch or recess $d$. Provision is thus made for one entire revolution of the pawl $c$ and sleeve C whenever the pawl is made to engage with the ratchet.

The end of the housing or casing opposite that engaged by the pawl $c$ is wholly or partially closed and is preferably provided with a bearing $d'$ in which the shaft A is journaled, but this is not essential as the shaft A may be otherwise supported. Adjacent to the bearing $d'$ and within the housing there is secured to the shaft A, a small ratchet E which is provided with ratchet teeth $e$. In this instance they are four in number. The sleeve C is provided with an outwardly extending arm $c^2$ to which is pivoted a pawl F. A spring $g$ is employed to hold the nose or point of the pawl F in engagement with the ratchet E. The opposite end of the pawl extends beyond its pivot and is of such length that it may be pressed inward to lift the nose or point of the pawl out of engagement with the teeth of the ratchet E. So long as the pawl F is in engagement with the ratchet E, whenever the pawl c engages the ratchet $A^2$ the ratchet E and shaft A will move in unison with it. If the pawl F is raised so as to pass over one of the teeth e of the ratchet E the movement of the ratchet and shaft will be less than that of pawl c and sleeve C, proportioned to the number of teeth of ratchet E. In the construction shown in the drawing the movement of the shaft will be one-fourth less than the entire revolution of the sleeve C.

The gearing connecting the shaft A with the feed plate is proportioned so that a certain definite number of seeds will be dropped on each entire revolution of the shaft A and by arranging a proportionate relation of the teeth e of the ratchet E, by raising the pawl F to pass one, two or more of the teeth of its ratchet, the feed will be proportionately reduced. In the present case there are four teeth on the ratchet E and an entire revolution of the shaft A is arranged to drop four kernels.

The means which I employ to raise the pawl F is the lever G. This lever is pivoted at $g'$ and a part thereof from $g^2$ to $g^3$ is made to enter a slot in the casing D. Between the points $g^2$, $g^3$ the underside of the lever is provided with a concave or cam surface to engage the free end or tail of the pawl F, and the construction is such that the lever can be raised to a position in which it will not engage the pawl at all or can be depressed to engage the pawl and raise it to pass over one of the ratchet teeth e, and if still further depressed will cause the pawl to pass over two of the teeth of the ratchet. By varying the proportions of the parts a greater range of variation can be effected.

An extension $g^4$ of the lever G works in a slot in the curved bracket or standard H. This extension is of some resiliency and bears against the right side of the slot. This side of the slot is provided with three notches 4, 3 and 2 into which the lever extension will spring when brought opposite them and the lever be held in the position to which it has been brought to cause the notch to be engaged. For instance if $g^4$ is made to engage notch 4 the lever G will be raised so as not to engage the pawl F at all and four seeds or kernels will be dropped at each actuation of the shaft. If the lever be depressed to cause $g^4$ to engage notch 3 it will engage with the pawl F to raise the latter to pass over one of the teeth of the ratchet E and but three seeds will be dropped. If the lever be still further depressed and the extension $g^4$ made to enter notch 2, the lever will engage with the pawl F, for a longer period causing it to pass over two of the teeth of the ratchet E and but two seeds or kernels will be discharged by the seed plate at each actuation of the shaft.

The pawl c is designed to be forced out of the notch d and into engagement with the ratchet $A^2$ by the action of the check row mechanism. Any preferred means may be employed for this purpose. In this instance the check row shaft B is provided with the arm b having an inclined or cam face $b'$. When the check row shaft is turned this arm is raised and the cam face $b'$ comes into contact with the left side of the pawl or the extension $c^x$ thereof and forces the pawl out of the notch d and into engagement with the ratchet $A^2$.

One of the advantages of this construction is the facility with which the desired changes can be brought about. The mechanism is in addition in a very compact form and occupies very little space. The construction is simple, cheap, efficient and durable.

While in this form of my said invention the pawl c and sleeve C are shown and described as making one entire revolution on each actuation, it is obvious that they might be arranged to have less than an entire revolution at each actuation, and the same results secured.

What I claim and desire to secure by Letters Patent is:—

1. In a planter, the combination with a seed plate, of a constantly operating mechanism, and connecting means comprising a shaft for operating said plate, a revoluble device adapted to be connected with the constantly operating mechanism for a constant predetermined amount of movement, a pawl for connecting said revoluble device and said shaft and a lever provided with a cam surface for engaging said pawl and disconnecting the shaft and the revoluble device for a part of the movement of the latter.

2. In a planter, the combination with a seed plate and a shaft for actuating the same, of a constantly operating mechanism, and means for connecting said shaft and said constantly operating mechanism, comprising a revoluble device adapted to be connected with the constantly operating mechanism for a constant predetermined amount of movement, a ratchet connected with said shaft, a pawl connected with the revoluble device and normally engaging said ratchet, and a lever provided with a cam surface for engaging said pawl and disengaging it from said ratchet during a part of the movement of the revoluble device.

3. In a planter, the combination with a seed plate and a shaft for actuating the same, of a constantly operating mechanism and means connecting said constantly operating mechanism and said shaft, said means comprising a revoluble device adapted to be connected to said constantly operating mechanism for a constant predetermined movement, a pawl for connecting said revoluble device and said shaft and a lever provided with a cam surface for engaging said pawl and disconnecting the said shaft and said revoluble device for varying parts of the movement of the latter.

4. In a planter, the combination with a seed plate and a shaft for actuating the same, of a constantly operating mechanism and means for connecting said shaft with the constantly operating mechanism, comprising a revoluble device adapted to be connected with said constantly operating mechanism for a constant predetermined movement, a pawl for connecting said revoluble device and said shaft and a lever provided with a cam surface for engaging said pawl to disconnect the said shaft from said pawl for an interval during the movement of the said revoluble device, said lever being movable to different positions to vary the extent of the intervals in which the shaft and revoluble device are disconnected.

5. In a planter, the combination with a seed plate and a shaft for actuating the same, of a constantly rotating device revolubly mounted on said shaft, a sleeve loosely mounted on said shaft and adapted to be connected with said constantly rotating device for a constant predetermined movement, a ratchet rigidly secured to said shaft, a pawl carried by said sleeve and normally engaging said ratchet and a lever provided with a cam surface for engaging said pawl and raising it from said ratchet during a part of the movement of said sleeve.

6. In a planter, the combination with a seed plate and a shaft for actuating the same, of a constantly rotating device, a sleeve loosely mounted on said shaft and adapted to be connected with said constantly rotating device for a predetermined amount of movement, a ratchet rigidly secured to said shaft, a pawl pivoted intermediately of its ends on said sleeve and engaging said ratchet and a lever provided with a cam surface for engaging the outer end of said pawl to disengage said pawl from said ratchet for a part of the movement of said sleeve.

7. In a planter, the combination with a seed plate and a shaft for actuating the same, of a constantly rotating device, a sleeve loosely mounted on said shaft and adapted to be connected with said rotating device for a predetermined amount of movement, a ratchet secured to said shaft, a pawl pivoted intermediate its ends upon said sleeve with one end engaging said ratchet, and a lever having a concave portion for engaging the opposite end of said pawl to disengage the said pawl from said ratchet during a part of the movement of said sleeve.

8. In a planter, the combination with a shaft for actuating the seed plate, of a constantly rotating device, a sleeve loosely mounted on said shaft and means for connecting the same with the constantly rotating device for a predetermined amount of movement, a ratchet secured to said shaft, a pawl pivoted intermediate its ends upon said sleeve having one end normally engaging said ratchet, and a lever having a concave surface to engage the free end of said pawl, said lever being movable to different positions to bring said concave surface in engagement with said pawl for different amounts of its movement with said sleeve to disengage the shaft for different periods of time during the movement of the said sleeve.

In testimony whereof I affix my signature, in the presence of two witnesses.

WILLIAM L. BEALL.

Witnesses:
Wm. F. Doyle,
J. K. Moore.

Copies of this patent may be obtained for five cents each, by addressing the "Commissioner of Patents, Washington, D. C."